US012478935B2

(12) United States Patent
Xu et al.

(10) Patent No.: US 12,478,935 B2
(45) Date of Patent: Nov. 25, 2025

(54) DEVICE AND METHOD FOR MIXING MAGNETIC BEAD REAGENT AND SAMPLE ANALYSIS APPARATUS

(71) Applicant: Shenzhen Mindray Bio-Medical Electronics Co., Ltd., Shenzhen (CN)

(72) Inventors: Wenbo Xu, Shenzhen (CN); Yanwen Weng, Shenzhen (CN); Jun Wang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 851 days.

(21) Appl. No.: 17/506,487

(22) Filed: Oct. 20, 2021

(65) Prior Publication Data

US 2022/0040650 A1 Feb. 10, 2022

Related U.S. Application Data

(63) Continuation of application No. PCT/CN2019/083626, filed on Apr. 22, 2019.

(51) Int. Cl.
*B01F 33/05* (2022.01)
*B01F 29/80* (2022.01)
(Continued)

(52) U.S. Cl.
CPC ............ *B01F 33/053* (2022.01); *B01F 29/80* (2022.01); *B01F 31/10* (2022.01); *B01F 33/451* (2022.01)

(58) Field of Classification Search
CPC ...... B01F 33/053; B01F 29/80; B01F 33/451; B01F 33/813; B01F 29/10; B01F 33/452; B01F 31/10; G01N 35/02
(Continued)

(56) References Cited

U.S. PATENT DOCUMENTS 3,219,318 A * 11/1965 Hershler ............ G01N 35/0098 241/1
3,622,128 A * 11/1971 Geiser ..................... F27D 27/00 366/144
(Continued)

FOREIGN PATENT DOCUMENTS

CN 201249110 Y 6/2009
CN 101700477 A 5/2010
(Continued)

*Primary Examiner* — Charles Cooley
(74) *Attorney, Agent, or Firm* — Syncoda LLC; Feng Ma

(57) ABSTRACT

A mixing device for a magnetic bead reagent includes a magnetic member, a container storage mechanism, and a drive mechanism. The container storage mechanism includes a mounting part for mounting a magnetic bead liquid container storing a magnetic bead reagent, and the mounting part corresponds to the magnetic member, enabling the container on the mounting part to be located within the magnetic field. The drive mechanism has a drive structure capable of driving at least one of the magnetic member, the mounting part, and the container to move, and thus generating a relative movement between the container and the magnetic field. The direction of the magnetic force acting on the magnetic beads is changed by the relative movement between the magnetic bead reagent and the magnetic field, such that the magnetic beads flow along different directions under the magnetic force, thereby increasing mixing efficiency of magnetic bead reagent.

20 Claims, 5 Drawing Sheets

(51) Int. Cl.
*B01F 31/10* (2022.01)
*B01F 33/451* (2022.01)

(58) Field of Classification Search
USPC .................................. 366/237–238, 273–274
See application file for complete search history.

(56) References Cited

U.S. PATENT DOCUMENTS

| | | | | | |
|---|---|---|---|---|---|
| 3,967,934 | A * | 7/1976 | Seitz | G01N 11/10 | 73/54.15 |
| 3,985,649 | A * | 10/1976 | Eddelman | B01D 35/06 | 210/695 |
| 4,390,283 | A * | 6/1983 | Meyer | B01F 29/80 | 366/225 |
| 4,876,069 | A * | 10/1989 | Jochimsen | G01N 21/03 | 356/442 |
| 5,352,036 | A * | 10/1994 | Haber | B01F 31/441 | 604/82 |
| 5,529,391 | A * | 6/1996 | Kindman | B01F 35/92 | 366/145 |
| 6,033,574 | A * | 3/2000 | Siddiqi | B03C 1/288 | 436/526 |
| 6,176,609 | B1 | 1/2001 | Cleveland et al. | | |
| 6,357,907 | B1 * | 3/2002 | Cleveland | B01F 33/452 | 366/273 |
| 6,382,827 | B1 * | 5/2002 | Gebrian | B01F 33/452 | 366/274 |
| 6,467,946 | B1 * | 10/2002 | Gebrian | B01F 33/452 | 366/273 |
| 6,880,384 | B2 * | 4/2005 | Hvidtfeldt | B01F 31/441 | 422/417 |
| 6,905,656 | B1 * | 6/2005 | Ladlow | B01F 33/452 | 422/561 |
| 7,384,559 | B2 * | 6/2008 | a Brassard | G01N 33/54326 | 436/526 |
| 7,484,880 | B2 * | 2/2009 | Cleveland | B01F 33/452 | 366/273 |
| 8,317,389 | B2 * | 11/2012 | Jagle | B01F 33/81 | 366/208 |
| 10,179,899 | B2 * | 1/2019 | Whitman | B01F 33/452 | |
| 10,258,947 | B2 * | 4/2019 | Ozeki | B01F 27/276 | |
| 10,610,843 | B2 * | 4/2020 | Cauley, III | C12N 1/06 | |
| 11,761,972 | B2 * | 9/2023 | Inaba | G01N 35/04 | 422/63 |
| 2002/0118594 | A1 * | 8/2002 | Vellinger | B01F 33/452 | 366/127 |
| 2005/0155921 | A1 * | 7/2005 | Siddiqi | B03C 1/01 | 210/695 |
| 2009/0220979 | A1 | 9/2009 | Davis et al. | | |
| 2011/0188339 | A1 | 8/2011 | Howell, Jr. et al. | | |
| 2014/0086005 | A1 * | 3/2014 | Vincent | B01L 3/52 | 366/237 |
| 2017/0352460 | A1 | 12/2017 | Xu et al. | | |
| 2020/0030816 | A1 * | 1/2020 | Kronshage | B03C 1/288 | |
| 2021/0154631 | A1 * | 5/2021 | Su | B01F 31/24 | |

FOREIGN PATENT DOCUMENTS

| | | | |
|---|---|---|---|
| CN | 202460530 | U | 10/2012 |
| CN | 102764607 | A | 11/2012 |
| CN | 202570040 | U | 12/2012 |
| CN | 103235148 | A | 8/2013 |
| CN | 203170251 | U | 9/2013 |
| CN | 104226168 | A | 12/2014 |
| CN | 204882191 | U | 12/2015 |
| CN | 105381827 | A | 3/2016 |
| CN | 105510613 | A | 4/2016 |
| CN | 205562577 | U | 9/2016 |
| CN | 206657019 | U | 11/2017 |
| CN | 207798506 | U | 8/2018 |
| CN | 208082677 | U | 11/2018 |
| CN | 109622086 | A | 4/2019 |
| DE | 102005030986 | A1 | 1/2007 |
| JP | 2006247535 | A | 9/2006 |
| JP | 2018194305 | A | 12/2018 |

* cited by examiner

DEVICE AND METHOD FOR MIXING MAGNETIC BEAD REAGENT AND SAMPLE ANALYSIS APPARATUS

CROSS-REFERENCE TO RELATED APPLICATIONS

This application is a continuation of International Application No. PCT/CN2019/083626, filed Apr. 22, 2019, the content of which is incorporated herein by reference.

TECHNICAL FIELD

The disclosure relates to the technical field of medical apparatus and instruments, and, in particular, to a device and a method for mixing a magnetic bead reagent.

BACKGROUND

Magnetic bead reagents are widely applied in the field of sample analysis, such as heterophase chemiluminescence immunoassay. The magnetic bead reagents usually comprise magnetic beads, markers thereof and buffer solutions. In use, a magnetic bead reagent is aspirated by a corresponding reagent aspiration device and delivered to a corresponding reaction container. Since the magnetic bead reagents themselves are prone to deposition and hardening when stored, it is necessary to fully mix the magnetic bead reagents before they are aspirated, so as to guarantee the accuracy of test results. In particularly, since magnetic beads of a high concentration are conducive to improvement of the repeatability of test results, the concentration of the magnetic beads in the magnetic bead reagents used at present are increasing, and the higher the concentration of the magnetic beads is, the more serious the deposition effect is.

In order to eliminate the problem of magnetic bead deposition, some test equipment manufacturers require users to mix the magnetic bead reagents manually before loading the same. However, manual mixing is inefficient, time-consuming, and laborious, and is almost impossible to be implemented particularly for high-concentration magnetic beads with streptavidin being marked, thus seriously influencing work efficiency of users. Some other manufacturers either directly stir magnetic bead reagents in magnetic bead cavities, or use mechanical rotation or ultrasonic system to mix the magnetic beads, each of which has corresponding drawbacks. It can be seen that a mixing solution for the magnetic bead reagents needs to be further studied.

SUMMARY

The disclosure provides a novel mixing device and a novel mixing method for a magnetic bead reagent and a sample analysis apparatus.

An embodiment of the disclosure provides a mixing device for a magnetic bead reagent, comprising:

- at least one magnetic member configured to generate a magnetic field;
- a reagent container storage mechanism having at least one mounting part, the mounting part being configured to mount a magnetic bead liquid container which stores a magnetic bead reagent to be mixed, and being arranged corresponding to the magnetic member, such that the magnetic bead liquid container located on the mounting part is capable of being located in the magnetic field; and
- a driving mechanism having a driving structure capable of driving at least one of the magnetic member, the mounting part and the magnetic bead liquid container to move, such that a relative movement occurs between the magnetic bead liquid container and the magnetic field.

In an embodiment, the mounting part has a structure capable of defining an arrangement in which the magnetic bead liquid container extends longitudinally along a first axis, and a south pole or a north pole of the magnetic member is arranged in a direction at a non-zero angle with respect to the first axis.

In an embodiment, the south pole or the north pole of the magnetic member is oriented perpendicularly to the first axis.

In an embodiment, the driving mechanism comprises a first driving assembly, the first driving assembly being capable of driving the magnetic bead liquid container to alternately rotate in forward and reverse directions.

In an embodiment, the at least one mounting part comprises at least two mounting parts, each mounting part being configured to mount a magnetic bead liquid container, wherein the mounting parts are arranged on a periphery of the magnetic member along an arc or a circle, such that the magnetic bead liquid containers located on the mounting parts are capable of being arranged around the magnetic member.

In an embodiment, the reagent container storage mechanism comprises an annular base, the mounting parts are arranged on the annular base along an arc or a circle, and the magnetic member is located at a central hole of the annular base.

In an embodiment, the first driving assembly comprises a first gear disk, a second gear disk which is concentric with and fixedly connected to the annular base, and an electric motor for driving the second gear disk to rotate, wherein the first gear disk is fixedly arranged and located at the central hole of the annular base, and gear teeth of the first gear disk extending into mounting areas of the mounting parts, where the magnetic bead liquid containers are mounted, such that the gear teeth of the first gear disk are capable of meshing with a gear on each magnetic bead liquid container.

In an embodiment, the first driving assembly comprises a first gear disk and an electric motor for driving the first gear disk to rotate, the mounting part are arranged around the first gear disk along an arc or a circle, and gear teeth of the first gear disk extend into mounting areas of the mounting parts, where the magnetic bead liquid containers are mounted, such that the gear teeth of the first gear disk are capable of meshing with a gear on each magnetic bead liquid container.

In an embodiment, the magnetic member is fixedly mounted on the first gear disk.

In an embodiment, the at least one magnetic member comprises at least two magnetic members, which are arranged on the first gear disk along an arc or a circle.

In an embodiment, the number of the magnetic members is the same as the number of the mounting parts, and each magnetic member corresponds to one mounting part, such that the magnetic bead liquid container located on each mounting part is capable of being located in the magnetic field of the corresponding magnetic member.

In an embodiment, the driving mechanism comprises a second driving assembly, the second driving assembly having an output end in transmission connection to the reagent container storage mechanism to drive the mounting part to rotate around the magnetic member.

In an embodiment, the mounting part is provided with a limiting bulge and/or a limiting recess for mounting the magnetic bead liquid container.

An embodiment of the disclosure provides another mixing device for a magnetic bead reagent, comprising:

at least one magnetic member configured to generate a magnetic field;

a reagent container storage mechanism having at least one mounting part;

a magnetic bead liquid container configured to store a magnetic bead reagent to be mixed, the magnetic bead liquid container being mounted on the mounting part and located in the magnetic field generated by the magnetic member; and a driving mechanism in transmission connection to at least one of the magnetic member, the mounting part and the magnetic bead liquid container to generate a relative movement between the magnetic bead liquid container and the magnetic field.

In an embodiment, a south pole or a north pole of the magnetic member is oriented toward a side wall of a cavity of the magnetic bead liquid container.

In an embodiment, the south pole or the north pole of the magnetic member is oriented perpendicularly to the side wall of the cavity of the magnetic bead liquid container.

In an embodiment, the driving mechanism comprises a first driving assembly, and the first driving assembly is in transmission connection to the magnetic bead liquid container to drive the magnetic bead liquid container to alternately rotate in forward and reverse directions.

In an embodiment, the at least one mounting part comprises at least two mounting parts, each mounting part being configured to mount a magnetic bead liquid container, wherein the mounting parts are arranged on a periphery of the magnetic member along an arc or a circle, such that the magnetic bead liquid containers located on the mounting parts are arranged around the magnetic member.

In an embodiment, the reagent container storage mechanism comprises an annular base, the mounting parts are arranged on the annular base, and the magnetic member is located at a central hole of the annular base.

In an embodiment, the first driving assembly comprises a first gear disk, a second gear disk which is concentric with and fixedly connected to the annular base, and an electric motor for driving the second gear disk to rotate, wherein the first gear disk is fixedly arranged and located at the central hole of the annular base, each of the magnetic bead liquid containers is equipped with a gear concentric therewith, and gear teeth of the first gear disk mesh with the gear on each magnetic bead liquid container to drive the magnetic bead liquid container to rotate.

In an embodiment, the first driving assembly comprises a first gear disk and an electric motor for driving the first gear disk to rotate, the mounting parts are arranged around the first gear disk along an arc or a circle, each of the magnetic bead liquid containers is equipped with a gear concentric therewith, and gear teeth of the first gear disk mesh with the gear on each magnetic bead liquid container to drive the magnetic bead liquid container to rotate.

In an embodiment, the magnetic member is fixedly mounted on the first gear disk.

In an embodiment, the at least one magnetic member comprises at least two magnetic members, which are arranged on the first gear disk along an arc or a circle.

In an embodiment, the number of the magnetic members is the same as the number of the mounting parts, and each magnetic member corresponds to one mounting part, such that the magnetic bead liquid container located on each mounting part is capable of being located in the magnetic field of the corresponding magnetic member.

In an embodiment, the driving mechanism comprises a second driving assembly, and the second driving assembly has an output end in transmission connection to the reagent container storage mechanism to drive the mounting part to rotate around the magnetic member.

In an embodiment, the magnetic bead liquid container is rotatably mounted on the mounting part.

In an embodiment, the mixing device further comprises a reagent assembly, and the reagent assembly comprises a test tube holder, at least one additional reagent tube for storing another reagent and the magnetic bead liquid container, wherein the magnetic bead liquid container is rotatably mounted on the test tube holder, and the test tube holder being removably mounted on the mounting part.

An embodiment of the disclosure provides a sample analysis apparatus comprising a mixing device described in any one of the above embodiments for mixing a magnetic bead reagent.

An embodiment of the disclosure provides a mixing method for mixing a magnetic bead reagent, comprising:

magnetic field establishing step: providing a magnetic field for attracting magnetic beads;

reagent inputting step: placing a magnetic bead reagent to be mixed in the magnetic field; and mixing step: moving at least one of the magnetic field and the magnetic bead reagent to change a relative position of the magnetic bead reagent in the magnetic field.

In an embodiment, in the mixing step, alternately rotating a magnetic bead liquid container loaded with the magnetic bead reagent in forward and reverse directions.

In an embodiment, in the mixing step, rotating the magnetic bead reagent around a magnetic member generating the magnetic field.

In an embodiment, the mixing method further comprises providing a mixing device as described in any one of the above embodiments, and the mixing method is applied to the mixing device.

The disclosure has a number of beneficial effects:

The direction in which a magnetic force acts on the magnetic beads are changed by the relative movement between the magnetic bead reagent and the magnetic field, such that the magnetic beads flow in different directions under the action of the magnetic force and are thus mixed, without manual mixing by a user, thereby greatly improving the efficiency of mixing magnetic bead reagent.

DETAILED DESCRIPTION

The disclosure is further described below in details through preferred embodiments in combination with accompanying drawings, in which similar elements in different embodiments are provided with associated similar reference numbers. In the following embodiments, many details are described such that the disclosure can be better understood. However, it can be effortlessly appreciated by a person skilled in the art that some features may be omitted, or may be substituted by other elements, materials, and methods in different cases. In certain cases, some operations involved in the disclosure are not displayed or described in the specification, which is to prevent a core part of the disclosure from being obscured by too much description. Moreover, for a person skilled in the art, detailed description of the involved operations is not necessary, and the involved operations can be thoroughly understood according to the description in the specification and general technical knowledge in the art.

In addition, the characteristics, operations, or features described in the specification may be combined in any appropriate manner to form various embodiments. Meanwhile, the steps or actions in the method description may also be exchanged or adjusted in order in a way that is obvious to a person skilled in the art. Therefore, the various orders in the specification and the accompanying drawings are merely for the purpose of clear description of a certain embodiment and are not meant to be a necessary order unless it is otherwise stated that a certain order must be followed.

The serial numbers themselves for the components herein, for example, “first” and “second”, are merely used to distinguish described objects, and do not have any sequential or technical meaning. Moreover, as used in the disclosure, “connection” or “coupling”, unless otherwise stated, comprises both direct and indirect connections (couplings).

An embodiment of the disclosure provides a mixing device for a magnetic bead reagent.

Figure 1:
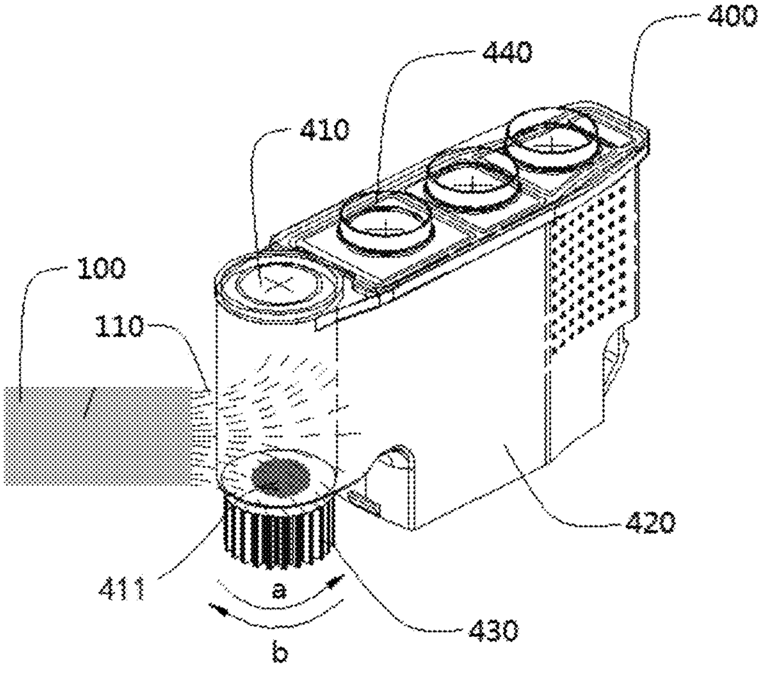
FIG. 1 is a schematic diagram of a deposition state of a magnetic bead reagent (before magnetic beads are attracted by a magnetic field) according to an embodiment of the disclosure.
Figure 2:
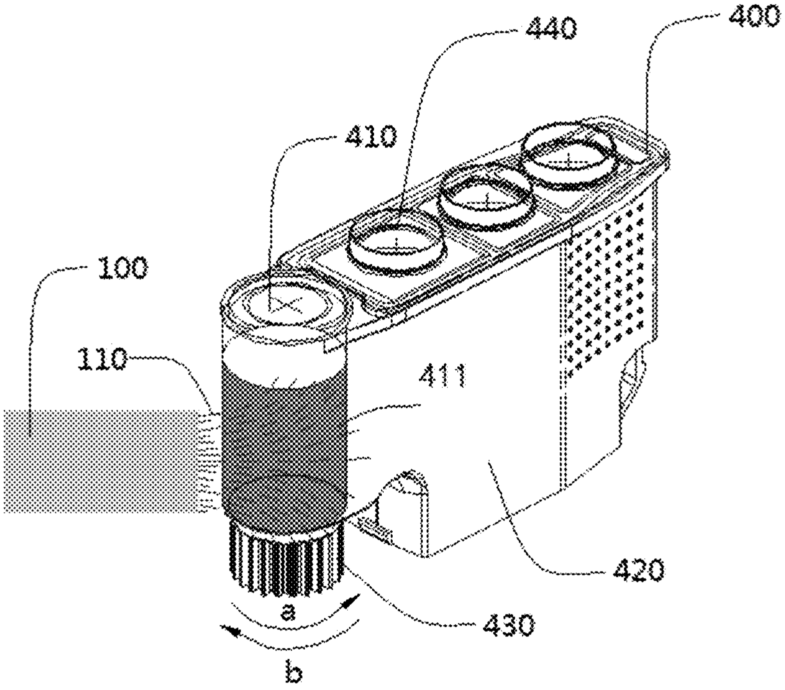
FIG. 2 is a schematic diagram of the magnetic beads being attracted by the magnetic field according to an embodiment of the disclosure.

With reference to FIGS. 1 and 2, the mixing device includes a magnetic member 100, a reagent container storage mechanism (not shown in the figures) and a driving mechanism (not shown in the figures).

The magnetic member 100 is configured to generate a magnetic field. The magnetic member 100 may be either a magnet or an electromagnetic assembly, such as an energized coil. Whatever capable of generating a magnetic field effect belongs to the magnetic member 100 shown in this embodiment.

The reagent container storage mechanism has at least one mounting part which is configured to mount a magnetic bead liquid container 410 for storing a magnetic bead reagent to be mixed and which is arranged corresponding to the magnetic member 100, such that the magnetic bead liquid container 410 located on the mounting part is capable of being located in the magnetic field. Herein, a relative position of the mounting part and the magnetic member 100 is defined by a relative position of the magnetic bead liquid container 410 and the magnetic field. In practice, the mounting part may be located at any position relative to the magnetic member 100, which only needs to meet the condition that the magnetic bead liquid container 410 located on the mounting part falls within the magnetic field of the corresponding magnetic member 100. For example, the mounting part may be located above the magnetic member 100, flush with the magnetic member 100, located below the magnetic member 100, etc. The magnetic bead liquid container 410 may finally fall within the magnetic field of the corresponding magnetic member 100 by means of the structural arrangement of the mounting part and the magnetic bead liquid container 410.

The driving mechanism has a driving structure capable of driving at least one of the magnetic member 100, the mounting part and the magnetic bead liquid container 410 to move and thus generating a relative movement between the magnetic bead liquid container 410 and the magnetic field. That is, the driving mechanism is in transmission connection to at least one of the magnetic member 100, the mounting part and the magnetic bead liquid container 410 to drive the magnetic bead liquid container 410 to move relative to the magnetic field. The movement of the magnetic bead liquid container 410 relative to the magnetic field includes, but is not limited to, rotation about its own axis, translation, turnover, etc.

The driving mechanism may use various power sources (such as an electric motor, an air cylinder, a hydraulic cylinder, an electromagnet, etc.) as driving force, and transmit movement to at least one of the magnetic member 100, the mounting part and the magnetic bead liquid container 410 via a corresponding transmission mechanism. With reference to FIG. 1, a large number of magnetic beads 411 will be deposited at a bottom of the magnetic bead liquid container 410 before the magnetic bead reagent is mixed. When the magnetic bead liquid container 410 is placed in the magnetic field, the magnetic field can separate the magnetic beads 411 from the bottom within a short time. Then, as shown in FIG. 2, the relative movement between the magnetic bead reagent and the magnetic field changes a direction in which a magnetic force acts on the magnetic beads 411 such that the magnetic beads 411 flow in different directions under the action of the magnetic force and are thus quickly mixed without manual mixing by a user, thereby greatly improving the efficiency of mixing magnetic bead reagent.

According to the above principle, when one of the magnetic member 100, the mounting part and the magnetic bead liquid container 410 is moved, the relative movement between the magnetic bead reagent and the magnetic field can be realized. Of course, moving any two or all three of the magnetic member 100, the mounting part and the magnetic bead liquid container 410 can realize the relative movement between the magnetic bead reagent and the magnetic field. Based on this, more variants may be made by those skilled in the art, which are not described in detail one by one herein.

It should be stated that, in order to better set out the inventive concept of the disclosure, the magnetic bead liquid container 410 is introduced in the description of embodiments, and the magnetic bead liquid container 410 is illustrated in the accompanying drawings. However, in practice, the mixing device of the embodiments may or may not include the magnetic bead liquid container 410, that is, in one solution, the magnetic bead liquid container 410 may be regarded as an integral part of the mixing device, and in another solution, the magnetic bead liquid container 410 may be regarded as an application object of the mixing device rather than an integral part of the mixing device. The magnetic bead liquid container 410 mentioned herein merely refers to a cavity tube body for the magnetic beads 411, which may be present alone or be combined with other tube bodies to form a reagent assembly 400 for use. As shown in FIGS. 1 and 2, the reagent assembly 400 includes not only the magnetic bead liquid container 410 but also other related reagent containers 440.

Further, in an embodiment, the mounting part has a structure capable of defining an arrangement in which the magnetic bead liquid container 410 extends longitudinally along a first axis. The arrangement in which the magnetic bead liquid container 410 extends longitudinally along the first axis means that a central axis of the magnetic bead liquid container 410 coincides with the first axis, that is, after the magnetic bead liquid container 410 is mounted on the mounting part, the central axis thereof is the first axis of the corresponding mounting part.

With reference to FIGS. 1 and 2, in an embodiment, a south pole or a north pole of the magnetic member 100 is arranged in a direction at a non-zero angle with respect to the first axis. That is, the south pole or the north pole of the magnetic member 100 are oriented toward a side wall of a cavity of the magnetic bead liquid container 410, such that the orientations of the south pole and the north pole of the magnetic member 100 will not be at a zero angle with respect to the central axis of the magnetic bead liquid container 410. When the magnetic member 100 is a magnet, the south pole or the north pole of the magnetic member 100 is arranged in a direction at a non-zero angle with respect to the first axis, which may also be considered that a magnetizing direction of the magnetic member is arranged at a non-zero angle with respect to the first axis.

With this arrangement, magnetic induction lines 110 of the magnetic member 100 can be concentrated on one side of the magnetic bead liquid container 410, such that the magnetic beads 411 deposited at the bottom of the magnetic bead liquid container 410 can be attracted away and dispersed more quickly, thereby improving the mixing effect. Particularly, when the magnetic bead liquid container 410 rotates around its central axis, the movement amplitude of the magnetic bead 411 under the magnetic field can be larger, thereby improving the mixing effect. In addition, the space above and below the magnetic bead liquid container 410 can be saved as much as possible, so as to provide more space for the mounting part for mounting the magnetic bead liquid container 410.

In some more particular embodiments, an included angle between the south pole or the north pole of the magnetic member 100 and the first axis may be 15°, 30°, 45°, 60°, 75°, 90° or any other non-zero angle.

Further, with reference to FIG. 1, the south pole or the north pole of the magnetic member 100 is oriented perpendicularly to the first axis. That is, the south pole or the north pole of the magnetic member 100 is oriented perpendicularly to the side wall of the cavity of the magnetic bead liquid container 410. Such a perpendicular arrangement can allow most of the magnetic induction lines 110 of the magnetic member 100 pass through the side wall of the magnetic bead liquid container 410 to act on the magnetic beads 411, thereby further improving the mixing effect of the magnetic beads 411.

Further, after repeated experiments and analysis, the inventors have found that when the magnetic bead liquid container 410 rotates about its central axis, on one hand, the direction of the magnetic force acting on the magnetic bead 411 changes, and on the other hand, the centrifugal force generated by the rotation is also conducive to the mixing of the magnetic beads 411, and the combination of the two effects can produce a better mixing effect.

Therefore, in an embodiment, the driving mechanism includes a first driving assembly, which is capable of driving the magnetic bead liquid container 410 to alternately rotate in forward and reverse directions. That is, the first driving assembly is in transmission connection to the magnetic bead liquid container 410 to drive the magnetic bead liquid container 410 to alternately rotate in the forward and reverse directions. The rotation herein means that the magnetic bead liquid container 410 rotates about its central axis.

The first driving assembly may be in transmission connection to the magnetic bead liquid container 410 by using various transmission mechanisms, such as a gear transmission mechanism, a synchronous belt transmission mechanism, a chain transmission mechanism.

The first driving assembly drives the magnetic bead liquid container 410 to alternately rotate in the forward and reverse directions, such that on one hand the direction of the magnetic force acting on the magnetic beads 411 changes, on the other hand the centrifugal force generated by the rotation is also conducive to the mixing of the magnetic beads 411, and the combination of the two effects may produce a better mixing effect, and continuous changing of the rotation direction makes the direction of the centrifugal force change continuously, thereby further improving the mixing effect.

Of course, as a variant of this embodiment, durations of the forward and reverse rotations of the magnetic bead liquid container 410 may be the same or different, or durations of the forward and reverse rotations of the magnetic bead liquid container 410 may change periodically.

Figure 3:
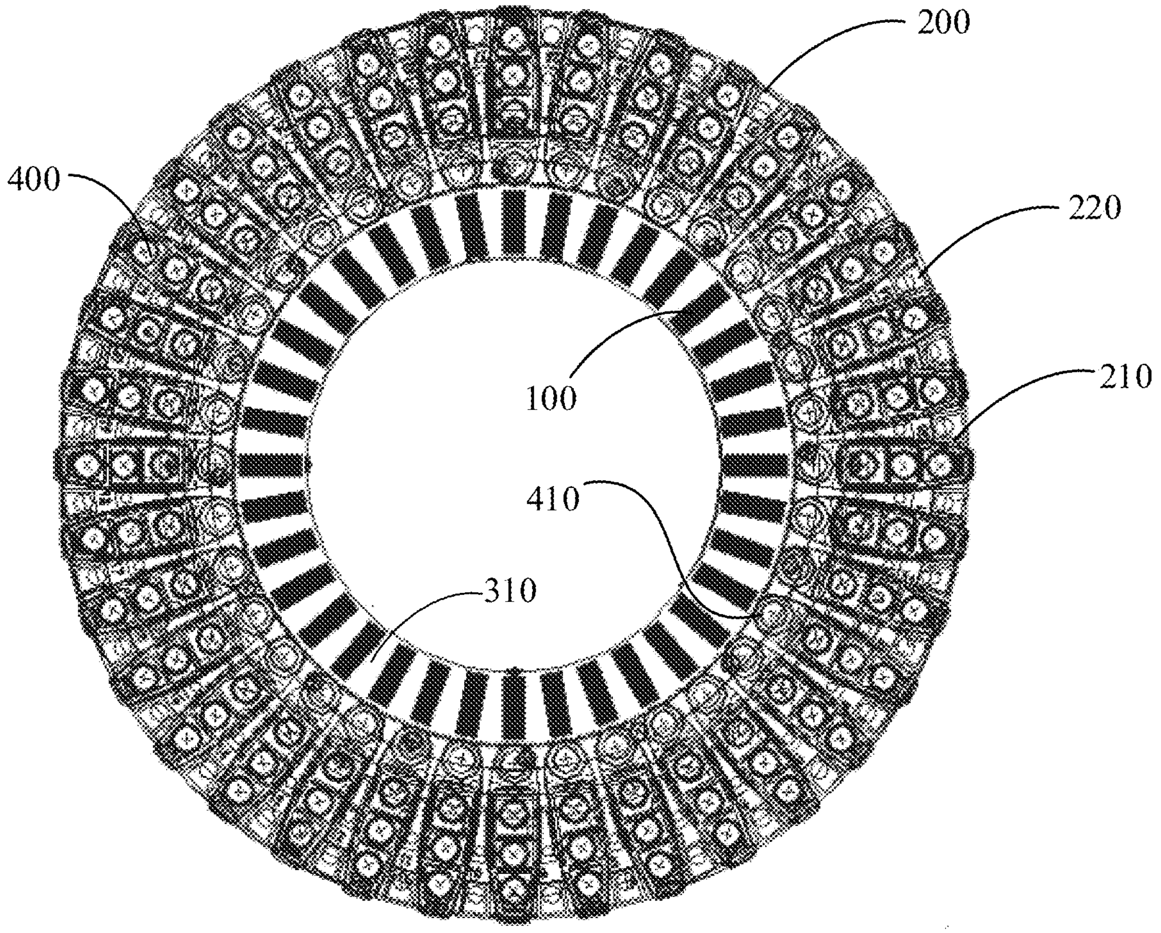
FIG. 3 is a top view of a mixing device according to an embodiment of the disclosure.

Further, with reference to FIG. 3, FIG. 3 shows a reagent container storage mechanism 200 and a mounting part 210 thereon. In an embodiment, at least two mounting parts 210 are provided and arranged on a periphery of the magnetic member 100 along an arc or a circle, such that the magnetic bead liquid containers 410 located on the mounting parts 210 can be arranged to surround the magnetic member 100. Such arrangement structure of the mounting parts 210 can improve the compactness of the whole device and reduce the size of the device, so as to increase the number of mounting parts 210 in the same area, for placing more magnetic bead liquid containers 410.

Figure 4:
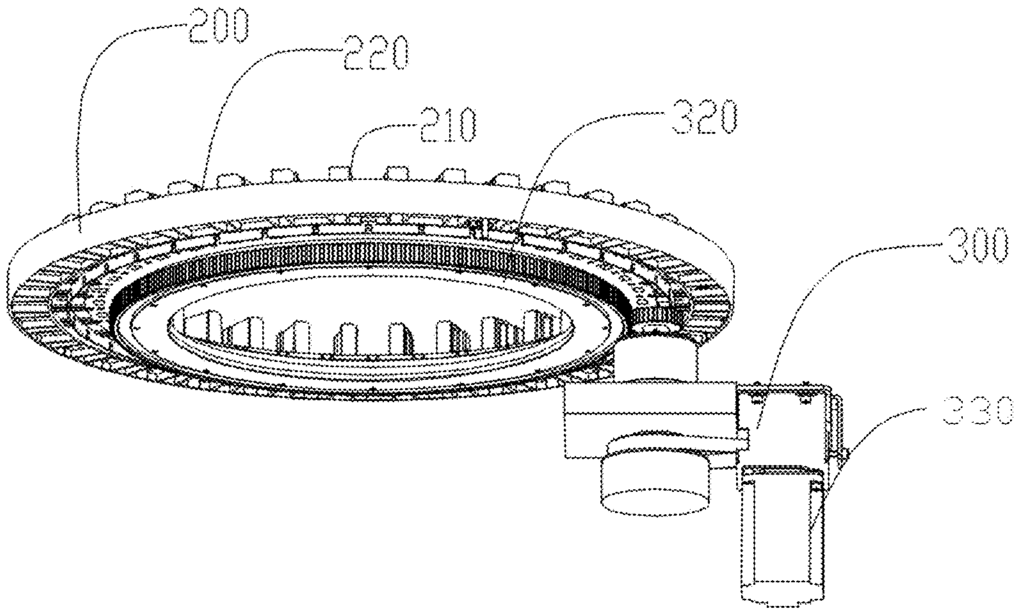
FIG. 4 is a structural schematic diagram of a first driving assembly according to an embodiment of the disclosure.

Further, with reference to FIGS. 3 and 4, in an embodiment, the reagent container storage mechanism 200 includes an annular base 220, the mounting parts 210 are arranged on the annular base 220, and the magnetic member 100 is located at a central hole of the annular base 220.

By means of the annular base 220, the magnetic bead liquid containers 410, after being mounted on the mounting parts 210, can be arranged around the magnetic member 100 along an arc or a circle. The central hole of the annular base 220 provides room for placing the magnetic member 100, so as to prevent positions of the annular base 220 and the magnetic member 100 from conflicting, and make the whole device more compact in structure and smaller in size.

There are many driving structures that may drive the magnetic bead liquid containers 410 to rotate. For miniaturization and transmission accuracy of transmission structure, a gear transmission structure may be used, and the following improvements may be made in one embodiment.

With reference to FIGS. 1-4, in one embodiment, the first driving assembly 300 includes a first gear disk 310, a second gear disk 320 which is concentric with and fixedly connected to the annular base 220, and an electric motor 330 for driving the second gear disk 320 to rotate. The first gear disk 310 is fixedly arranged and located at the central hole of the annular base 220. The mounting parts 210 are arranged to surround the first gear disk 310 in the form of an arc or a circle. Each magnetic bead liquid container 410 is provided with a gear 430 arranged concentric therewith, as shown in FIGS. 1 and 2. As shown in FIG. 3, gear teeth of the first gear disk 310 extend into mounting areas (where the magnetic bead liquid containers 410 are located) of the mounting parts 210, such that the gear teeth of the first gear disk 310 are capable of meshing with gear teeth of the gears 430 on the magnetic bead liquid containers 410.

As the second gear disk 320 is concentric with and fixedly connected to the annular base 220, when the second gear disk 320 is driven by the electric motor 330 to rotate, the annular base 220 is thus driven to rotate and then the magnetic bead liquid containers 410 thereon are driven to rotate around the first gear disk 310, thereby realizing the revolution of the mounting parts 210 and the magnetic bead liquid containers 410 relative to the first gear disk 310. As the first gear disk 310 meshes with the gears 430 on the magnetic bead liquid containers 410 as well, when the magnetic bead liquid containers 410 rotate relative to the first gear disk 310, the first gear disk 310 will react on the magnetic bead liquid containers 410 to make the same rotate. On one hand, the use of the gear transmission structure is conducive to structural miniaturization and improvement of transmission accuracy, and on the other hand, the gear transmission structure, on account of shape features of its gear, makes it possible to mesh with the gears 430 of at least two magnetic bead liquid containers 410 simultaneously in an arc-shaped or circular area, thereby driving the at least two magnetic bead liquid containers 410 to rotate.

In other embodiments, if the above inventive idea is not taken into consideration, a chain transmission structure, a belt transmission structure or other suitable transmission structures may be used as long as the magnetic bead liquid containers 410 can be driven to rotate.

Further, with reference to FIG. 3, in an embodiment, the magnetic member 100 is fixedly mounted on the first gear disk 310, which can greatly reduce the space occupied by the magnetic member 100. During each magnetic bead liquid container 410 rotating around the magnetic member 100, the position thereof relative to the magnetic member 100 may be changed, such that the magnetic member 100 may generate a magnetic attraction effect on the magnetic beads 411 in the magnetic bead liquid container 410 from different directions, which makes the magnetic beads move disorderly in more directions, thereby enhancing the mixing effect.

Specifically, when rotating around the magnetic member 100, the mounting parts 210 may bring the magnetic bead liquid containers 410 to rotate around the magnetic member 100, that is, the magnetic bead liquid containers 410 revolve around the magnetic member 100. The technical solution of the magnetic bead liquid containers 410 revolving around the magnetic member 100 and the technical solution of the magnetic bead liquid containers 410 rotating may be used separately, both of which can achieve mixing effect. In some embodiments, the technical solutions of revolving and rotating may be combined as well, that is, the magnetic bead liquid containers 410 rotates while the magnetic bead liquid containers 410 revolve around the magnetic member 100, so as to achieve a better mixing effect.

Of course, although the above design idea can bring about more beneficial effects in some embodiments, it should not be regarded as limitation on the inventive concept. In another embodiment, the first driving assembly may also include a first gear disk 310 and an electric motor for driving the first gear disk 310 to rotate. The mounting parts 220 are arranged to surround the first gear disk 310 in the form of an arc or a circle, gear teeth of the first gear disk 310 extend into mounting areas of the mounting parts 220, where the magnetic bead liquid containers are mounted, such that the gear teeth of the first gear disk 310 are capable of meshing with gear teeth of a gear 430 on each magnetic bead liquid container 410 to drive the magnetic bead liquid container 410 to rotate. In this embodiment, the annular base 220 (or the reagent container storage mechanism 200) may remain stationary, and the electric motor drives the first gear disk 310 to rotate. When rotating, the first gear disk 310 also rotates relative to the magnetic bead liquid containers 410 (with an effect equivalent to that achieved by the revolution of the magnetic bead liquid containers 410 relative to the first gear disk 310), and at the same time, the first gear disk 310 may still allow the magnetic bead liquid containers 410 to rotate.

In the various embodiments above, the revolution direction (forward or reverse direction) of the magnetic bead liquid containers 410 relative to the first gear disk 310 and the rotation direction (forward or reverse direction) of the magnetic bead liquid containers may be realized by changing the rotation direction output by the electric motor 330. With reference to FIGS. 1 and 2, the directions indicated by arrows a and b are directions in which the magnetic bead liquid containers 410 may rotate.

In addition to the various embodiments above, on the basis that the magnetic bead liquid containers 410 themselves rotate, other means may be used to allow the magnetic bead liquid containers 410 to revolve relative to the magnetic member 100. In an embodiment, the driving mechanism includes a second driving assembly, and the second driving assembly has an output end in transmission connection to the reagent container storage mechanism 200 to drive the mounting part(s) 210 to rotate around the magnetic member 100.

The mounting part(s) 210 is/are driven by the second driving assembly to rotate around the magnetic member 100, and the relative movement between the magnetic bead reagent and the magnetic field is realized by means of the movement of the mounting part(s) 210, which further improves the mixing effect of the mixing device in combination with the mixing effect produced by the rotation of the magnetic bead liquid containers 410. Specifically, an electric motor 330 or other suitable power sources may be used for the second driving assembly as well, and a gear transmission structure, a chain transmission structure, a belt transmission structure or other suitable structures may be used as a transmission structure for the second driving assembly. The first driving assembly 300 and the second driving assembly may be driven by the same power source as well, for example, different transmission mechanisms are driven by the same electric motor to realize the functions of the first driving assembly 300 and the second driving assembly.

Of course, when the magnetic bead liquid containers 410 revolve, the magnetic member 100 itself may be arranged to be rotatable or remain stationary. If the magnetic member 100 is arranged to be rotatable, for example, mounted on the above gear disk 210, the magnetic member 100 and the magnetic bead liquid containers 410 may have synchronous or asynchronous rotational speeds such that the movements thereof can improve the mixing efficiency. If the magnetic element 100 is arranged to be stationary, the revolution of the magnetic bead liquid containers 410 will make the same move between magnetic fields of different magnetic members 100, thereby generating movements in different directions and improving the mixing efficiency.

Further, the number of magnetic members 100 may be determined according to actual requirements. With reference to FIG. 3, in an embodiment, at least two magnetic members 100 are provided and arranged on the first gear disk 310 along an arc or a circle.

It is easy for the magnetic members 100 arranged along an arc or a circle to correspond to the magnetic bead liquid containers 410 surrounding the outer periphery of the magnetic members. Particularly, when the magnetic bead liquid containers 410 can revolve and the magnetic members 100 remain stationary, the magnetic members 100 can act on different magnetic bead liquid containers 410 in sequence.

Further, as shown in FIG. 3, in an embodiment, the number of the magnetic members 100 is the same as the number of the mounting parts 210, the mounting parts 210 encircle the magnetic members 100 in a circle, and each magnetic member 100 is arranged corresponding to one mounting part 210, such that the magnetic bead liquid container 410 located on each mounting part 210 can be located in the magnetic field of the corresponding magnetic member 100.

In the above structure, each magnetic bead liquid container 410 may be located in a corresponding magnetic field therefor. Particularly, when the magnetic bead liquid container 410 and the corresponding magnetic member 100 move synchronously and the magnetic bead liquid container 410 itself rotates, the magnetic beads 411 in the magnetic bead liquid container 410 can be mixed very well.

The position and the structure of the mounting part(s) 210 determine whether the mounted magnetic bead liquid container(s) 410 can be located in the magnetic field and determine the mounting stability of the magnetic bead liquid container(s) 410 during the mixing device working. According to actual requirements, there are various embodiments with different positions and structures of the mounting part(s) 210.

In an embodiment, the magnetic bead liquid container 410 may be a separate unit. The magnetic bead liquid container 410 is rotatably mounted on the mounting part 220.

In another embodiment, with reference to FIG. 3, as an example, the reagent assembly 400 shown in FIGS. 1 and 2 includes a test tube holder 420, at least one additional reagent tube 440 for storing another reagent and the magnetic bead liquid container 410. The magnetic bead liquid container 410 is rotatably mounted on the test tube holder 420, and the test tube holder 420 is removably mounted on the mounting part 210. For this, the mounting part 210 is provided with a limiting bulge and/or a limiting recess configured for mounting the test tube holder 420 and thus mounting the magnetic bead liquid container 410.

When mounting the magnetic bead liquid container 410, the test tube holder 420 is fixed by the limiting bulge and/or the limiting recess to complete mounting of the magnetic bead liquid container 410. In this embodiment, the mounting part 210 forms a mounting base structure, and the mounting part 210 may be arranged below and on one side of the magnetic member 100, such that the mounted magnetic bead liquid container 410 can be located in the magnetic field of the magnetic member 100.

In another embodiment, the mounting part has a clamping structure for clamping and releasing the magnetic bead liquid container. The magnetic bead liquid container is rotatably clamped by the clamping structure.

When mounting the magnetic bead liquid container, the magnetic bead liquid container is mounted by means of being clamped by the clamping structure. When the magnetic bead liquid container needs to be removed, the magnetic bead liquid container is released by the clamping structure first, and then removed. In this embodiment, the clamping structure may clamp an upper portion, a middle portion or a lower portion of the magnetic bead liquid container. When the clamping structure is configured to clamp the upper portion of the magnetic bead liquid container, the mounting part may be arranged above and on one side of the magnetic member. When the clamping structure is configured to clamp the middle portion of the magnetic bead liquid container, the mounting part may be arranged at the middle of one side of the magnetic member. When the clamping structure is configured to clamp the lower portion of the magnetic bead liquid container, the mounting part may be arranged below and on one side of the magnetic member, such that the mounted magnetic bead liquid container can be located in the magnetic field of the magnetic member.

In another embodiment, the mounting part is provided with a suspension structure for hanging the magnetic bead liquid container.

When mounting the magnetic bead liquid container, the magnetic bead liquid container is mounted by means of being hung on the suspension structure. In this embodiment, the magnetic bead liquid container is usually hung on the bottom of the mounting part, so the mounting part may be arranged above and on one side of the magnetic member, such that the mounted magnetic bead liquid container can be located in the magnetic field of the magnetic member.

In other embodiments, the mounting part may also have other suitable mounting structures as long as the magnetic bead liquid container can be mounted on the mounting part.

In view of the fact that external dust and suspended matters may accumulate on a surface of the mixing device and thus influence the service life and working effect of the mixing device and an operator may be injured if the operator accidentally reaches her/his hands into the first gear disk 310 during operation, an outer cover is provided for covering the mixing device in some embodiments.

Figure 5:
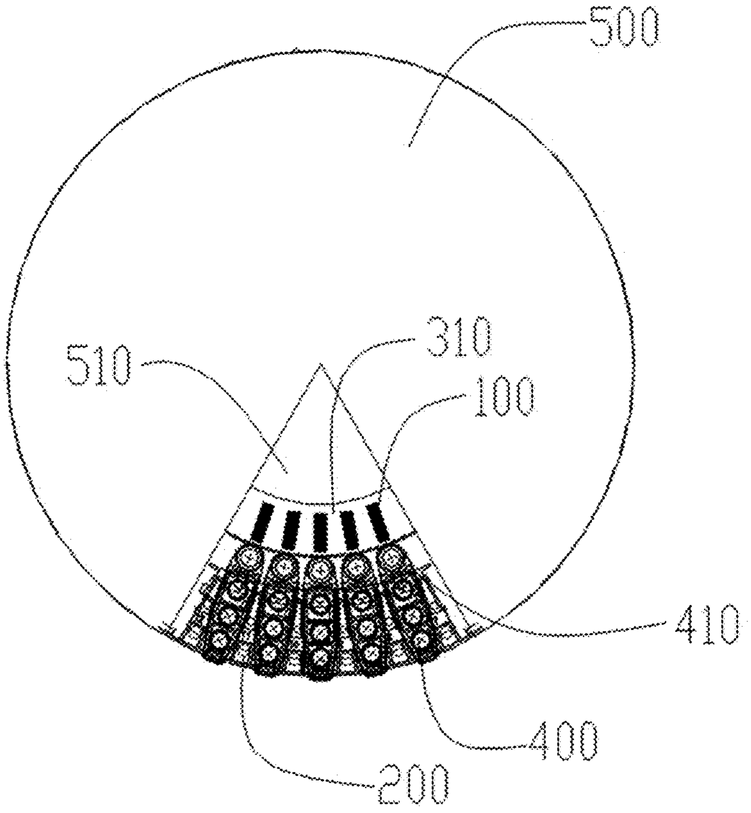
FIG. 5 is a schematic diagram of a mixing device with an outer cover according to an embodiment of the disclosure.

With reference to FIG. 5, in an embodiment, the mixing device further comprises an outer cover 500, and the outer cover 500 is configured to cover the top of the mixing device.

The outer cover 500 can reduce the dust accumulated on the surface of the mixing device, prolong the service life of the mixing device and improve the working effect of the mixing device on one hand, and can also reduce the possibility of injuries due to misoperation of the operator and thus improve the safety of the mixing device on the other hand.

With the outer cover 500 provided on the mixing device, operations may be inconvenient if the outer cover 500 needs to be opened every time a magnetic bead liquid container 410 is removed and input. An access 510 is provided on the outer cover 500 in some embodiments.

With reference to FIG. 5, in an embodiment, the outer cover 500 is provided with an access 510, and the access 510 is provided to correspond to the mounting part 210 and the magnetic bead liquid container 410.

The user may remove and input a magnetic bead liquid container 410 through the access 510, such that the user does not need to frequently open and close the outer cover 500, which facilitates the operation by the user. In this embodiment, the access 510 is sector-shaped. In other embodiments, the access may also be provided in the form of an annular sector or other suitable shapes. If the access is annular sector-shaped, the outer cover 500 can shield the first gear disk 310 more effectively.

In another aspect, an embodiment provides a sample analysis apparatus which includes any one of the mixing devices described above for mixing a magnetic bead reagent.

Specifically, the mixing device may be provided as a non-removable part of the sample analysis apparatus, and may also be provided as a removable structure.

Figure 6:
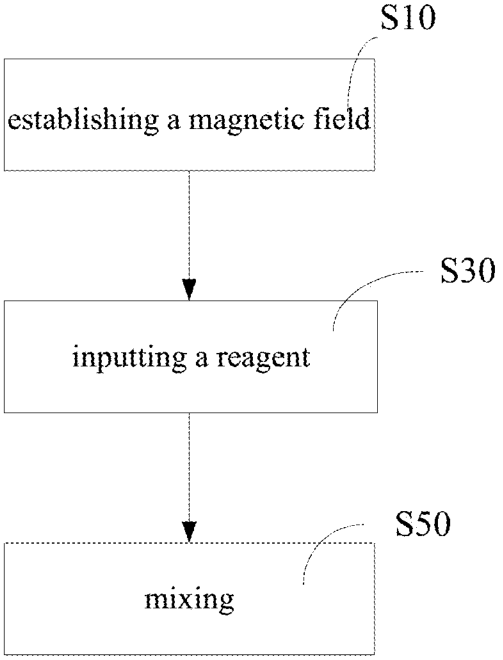
FIG. 6 is a schematic flowchart of a mixing method according to an embodiment of the disclosure.
Figure 7:
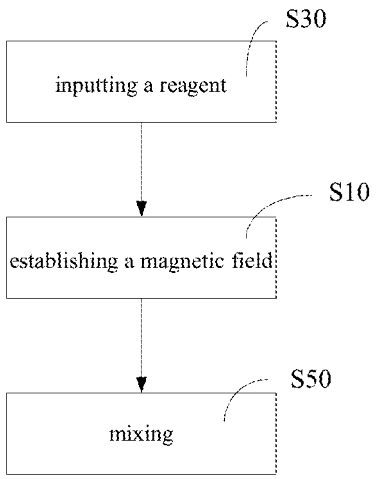
FIG. 7 is a schematic flowchart of another mixing method according to an embodiment of the disclosure.
Figure 8:
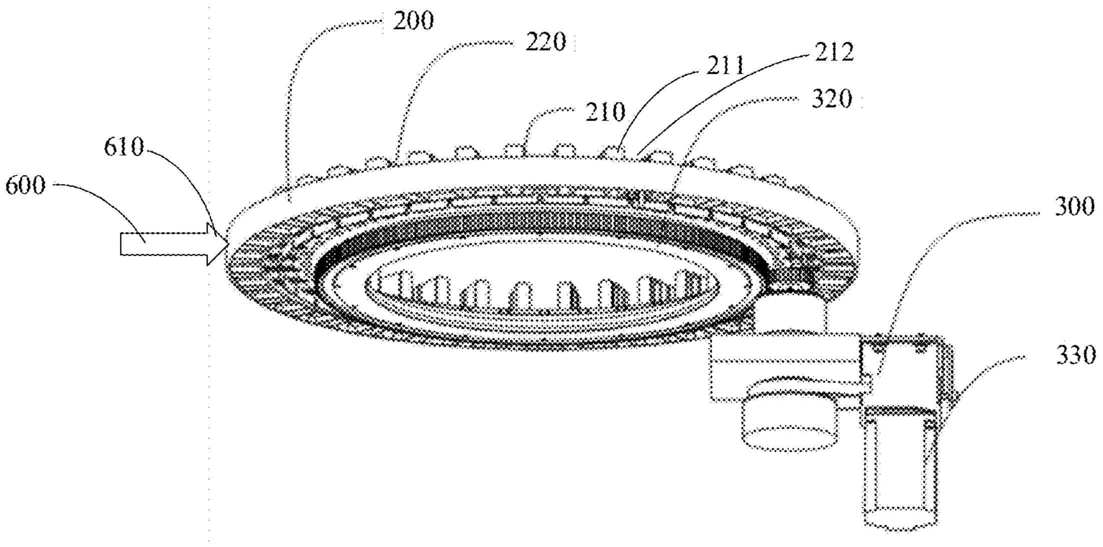
FIG. 8 is a schematic flowchart, which illustrates that the mounting part is provided with a limiting bulge 211 and/or a limiting recess 212 for mounting the magnetic bead liquid container, and illustrates that the driving mechanism comprises a second driving assembly 600 having an output end 610, and the output end 610 is in transmission connection to the reagent container storage mechanism to drive the mounting part to rotate around the magnetic member.

In another aspect, in conjunction with the embodiments above, an embodiment of the disclosure further provides a method for mixing a magnetic bead reagent. As shown in FIGS. 6 and 7, the method includes:

- establishing a magnetic field S10: providing a magnetic field for attracting magnetic beads; for example, a magnet is provided to generate the magnetic field, or a coil of an electromagnet is energized to generate the magnetic field;
- inputting a reagent S30: placing a magnetic bead reagent to be mixed in the magnetic field; for example, a reagent container filled with the magnetic bead reagent is placed into a reagent mounting part, and thus the magnetic bead reagent is located in the magnetic field, whereby the magnetic field generates an acting force on the magnetic beads in the magnetic bead reagent; and
- mixing S30: moving at least one of the magnetic field and the magnetic bead reagent to change a relative position of the magnetic bead reagent in the magnetic field; for example, the magnetic bead reagent container is rotated in forward and reverse directions (revolution or rotation, or both at the same time). The rotation of the reagent container can promote mixing of the magnetic bead reagent, and the acting force of the magnetic field can further improve the mixing effect.

The relative movement between the magnetic bead reagent and the magnetic field changes a direction in which the magnetic force acts on the magnetic beads, such that the magnetic beads flow in different directions under the action of the magnetic force and are thus mixed without manual mixing by a user.

As shown in FIG. 6, step S10 of establishing a magnetic field may be completed before step S30 of inputting a reagent. Alternatively, as shown in FIG. 7, step S10 of establishing a magnetic field may be completed after step S30 of inputting a reagent, Alternatively, the two steps may be carried out simultaneously.

Based on the above principle, the relative movement between the magnetic bead reagent and the magnetic field may be realized by moving the magnetic bead reagent in some mixing methods.

In the mixing step according to an embodiment, a magnetic bead liquid container loaded with the magnetic bead reagent alternately rotates in forward and reverse directions. The rotational movement cooperating with the magnetic attraction of the magnetic field can improve the mixing effect of the magnetic beads.

In the mixing step according to an embodiment, the magnetic bead reagent rotates around a magnetic member generating the magnetic field.

The above two embodiments separately disclose a mixing method in which the magnetic bead liquid container loaded with the magnetic bead reagent rotates, and a mixing method in which the magnetic bead liquid container loaded with the magnetic bead reagent revolves around the magnetic member, which may be used separately or in combination, that is, the magnetic bead liquid container revolves around the magnetic member while magnetic bead liquid container rotates, and when combining the two kinds of movements, the magnetic beads can move in more directions and the mixing effect is further improved.

In an embodiment, any one of the mixing devices above is provided, the mixing method is applied to the mixing device, and the mixing device as described in the above various embodiments is used to implement the mixing method.

The above content is a further detailed description of the disclosure in conjunction with particular embodiments, and specific implementation of the disclosure should not be construed as being limited to the description. For a person of ordinary skill in the art to which the disclosure pertains, a plurality of simple deductions or replacements can be made without departing from the concept of the disclosure.

What is claimed is:

1. A mixing device for a magnetic bead reagent, comprising:

at least one magnetic member configured to generate a magnetic field;

a reagent container storage mechanism having at least two mounting parts, each of the mounting parts being configured to mount a magnetic bead liquid container which stores a magnetic bead reagent to be mixed, the magnetic bead reagent comprising magnetic beads, and the at least two mounting parts being arranged corresponding to the magnetic member, such that the magnetic bead liquid container located on each of the mounting parts is capable of being in the magnetic field, wherein a south pole or a north pole of the magnetic member is oriented toward a side wall of a cavity of the magnetic bead liquid container on each of the mounting parts, wherein the at least two mounting parts are arranged on a periphery of the at least one magnetic member along an arc or a circle, such that the magnetic bead liquid containers located on the at least two mounting parts are capable of being arranged around the at least one magnetic member; and a driving mechanism having a driving structure, wherein the driving structure is capable of driving the magnetic bead liquid container to rotate around a central axis of the magnetic bead liquid container; and wherein the magnetic beads deposited at a bottom of the magnetic bead liquid container are dispersed, so as to mix the magnetic beads in the magnetic bead reagent under the rotation of the magnetic bead liquid container, wherein the driving structure comprises a first driving assembly, and the first driving assembly is capable of driving the magnetic bead liquid container to alternately rotate in forward and reverse directions.

2. The mixing device of claim 1, wherein each of the mounting parts has a structure capable of defining an arrangement in which the magnetic bead liquid container extends longitudinally along a first axis of a respective one of the mounting parts, a south pole or a north pole of the magnetic member is arranged in a direction at a non-zero angle with respect to the first axis of the respective one of the mounting parts, and the first axis of the respective one of the mounting parts coincides with the central axis of the magnetic bead liquid container mounted on the respective one of the mounting parts.

3. The mixing device of claim 2, wherein the south pole or the north pole of the magnetic member is oriented perpendicularly to the first axis of the respective one of the mounting parts.

4. The mixing device of claim 1, wherein the reagent container storage mechanism comprises an annular base, the mounting parts are arranged on the annular base along an arc or a circle, and the magnetic member is located at a central hole of the annular base.

5. The mixing device of claim 4, wherein the first driving assembly comprises a first gear disk, a second gear disk which is concentric with and fixedly connected to the annular base, and an electric motor for driving the second gear disk to rotate, wherein the first gear disk is fixedly arranged and located at the central hole of the annular base, and gear teeth of the first gear disk extend into mounting areas of the mounting parts, where the magnetic bead liquid containers are mounted, such that the gear teeth of the first gear disk are capable of meshing with gear teeth on the magnetic bead liquid containers.

6. The mixing device of claim 5, wherein the magnetic member is fixedly mounted on the first gear disk.

7. The mixing device of claim 6, wherein the at least one magnetic member comprises at least two magnetic members, which are arranged on the first gear disk along an arc or a circle.

8. The mixing device of claim 7, wherein the number of the magnetic members is the same as the number of the mounting parts, and each magnetic member corresponds to one mounting part, such that the magnetic bead liquid container located on each mounting part is capable of being located in the magnetic field of the corresponding magnetic member.

9. The mixing device of claim 5, wherein the first gear disk is configured to be stationary.

10. The mixing device of claim 1, wherein the first driving assembly comprises a first gear disk and an electric motor for driving the first gear disk to rotate, the mounting parts are arranged around the first gear disk along an arc or a circle, and gear teeth of the first gear disk extend into mounting areas of the mounting parts, where the magnetic bead liquid containers are mounted, such that the gear teeth of the first gear disk are capable of meshing with gear teeth on the magnetic bead liquid containers.

11. The mixing device of claim 1, wherein the driving structure further comprises a second driving assembly having an output end, and the output end is in transmission connection to the reagent container storage mechanism to drive the at least two mounting parts to rotate around the magnetic member.

12. The mixing device of claim 1, wherein each of the mounting parts is provided with at least one of a limiting bulge and a limiting recess for mounting the magnetic bead liquid container.

13. The mixing device of claim 1, wherein the south pole or the north pole of the magnetic member is oriented perpendicularly to the side wall of the cavity of the magnetic bead liquid container.

14. The mixing device of claim 1, wherein the mixing device further comprises an outer cover configured to cover the top of the mixing device, and the outer cover is provided with an access for inputting or removing the magnetic bead liquid container into or from the mixing device.

15. A mixing device for a magnetic bead reagent, comprising:

a reagent container storage mechanism having at least two mounting parts, each of the mounting parts being configured to mount a magnetic bead liquid container which stores a magnetic bead reagent to be mixed, wherein the magnetic bead reagent comprises magnetic beads;

a magnetic member configured to generate a magnetic field, the magnetic field acting on the magnetic bead reagent in the magnetic bead liquid container, and a south pole or a north pole of the magnetic member being oriented toward a side wall of a cavity of the magnetic bead liquid container on each of the mounting parts, such that the magnetic beads deposited at a bottom of the magnetic bead liquid container are dispersed, so as to mix the magnetic beads in the magnetic bead reagent under rotation of the magnetic bead liquid container; and a driving mechanism comprising a first driving assembly, wherein the first driving assembly is capable of driving the magnetic bead liquid container to alternately rotate in forward and reverse directions, wherein the at least two mounting parts are arranged on a periphery of the magnetic member along an arc or a circle, such that the magnetic bead liquid containers located on the at least two mounting parts are capable of being arranged around the magnetic member.

16. The mixing device of claim 15, wherein a south pole or a north pole of the magnetic member is oriented perpendicularly to the side wall of the cavity of the magnetic bead liquid container on each of the mounting parts.

17. The mixing device of claim 15, wherein the south pole or the north pole of the magnetic member is oriented perpendicularly to the central axis of the magnetic bead liquid container.

18. A mixing device for a magnetic bead reagent, comprising:

at least one magnetic member configured to generate a magnetic field, a reagent container storage mechanism having at least one mounting part, the at least one mounting part being configured to mount a magnetic bead liquid container which stores a magnetic bead reagent to be mixed, the magnetic bead reagent comprising magnetic beads, and the at least one mounting part being arranged corresponding to the magnetic member, such that the magnetic bead liquid container located on the at least one mounting part is capable of being in the magnetic field, wherein a south pole or a north pole of the magnetic member is oriented toward a side wall of a cavity of the magnetic bead liquid container on the at least one mounting part; and a driving mechanism having a driving structure, wherein the driving structure is capable of driving the magnetic bead liquid container to rotate around a central axis of the magnetic bead liquid container; and wherein the magnetic beads deposited at a bottom of the magnetic bead liquid container are dispersed, so as to mix the magnetic beads in the magnetic bead reagent under the rotation of the magnetic bead liquid container, wherein the driving structure comprises a first driving assembly, and the first driving assembly is capable of driving the magnetic bead liquid container to alternately rotate in forward and reverse directions; and wherein the driving structure further comprises a second driving assembly having an output end, and the output end is in transmission connection to the reagent container storage mechanism to drive the at least one mounting part to rotate around the magnetic member.

19. The mixing device of claim 18, wherein the at least one mounting part is provided with at least one of a limiting bulge and a limiting recess for mounting the magnetic bead liquid container.

20. The mixing device of claim 18, wherein the south pole or the north pole of the magnetic member is oriented perpendicularly to the side wall of the cavity of the magnetic bead liquid container.

* * * * *